US009848090B2

(12) United States Patent
Cai et al.

(10) Patent No.: US 9,848,090 B2
(45) Date of Patent: Dec. 19, 2017

(54) OFFLINE CHARGING PER SERVICE DATA FLOW

(75) Inventors: Yigang Cai, Naperville, IL (US); Ranjan Sharma, New Albany, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 265 days.

(21) Appl. No.: 13/357,478

(22) Filed: Jan. 24, 2012

(65) Prior Publication Data

US 2013/0188554 A1 Jul. 25, 2013

(51) Int. Cl.
*H04W 4/24* (2009.01)
*H04M 15/00* (2006.01)
*H04L 12/14* (2006.01)

(52) U.S. Cl.
CPC ........ *H04M 15/65* (2013.01); *H04L 12/1407* (2013.01); *H04M 15/66* (2013.01)

(58) Field of Classification Search
USPC .............................. 370/241; 709/227; 705/34
See application file for complete search history.

(56) References Cited

U.S. PATENT DOCUMENTS

| | | | | |
|---|---|---|---|---|
| 2007/0124160 A1* | 5/2007 | Duan | ................... | G06Q 40/025 705/38 |
| 2008/0046963 A1* | 2/2008 | Grayson | ................. | H04L 12/66 726/1 |
| 2008/0182549 A1* | 7/2008 | Cai | ......................... | H04L 12/14 455/406 |
| 2009/0182883 A1* | 7/2009 | Giaretta et al. | ................ | 709/228 |
| 2010/0039941 A1* | 2/2010 | Tan | ......................... | H04L 12/14 370/241 |
| 2012/0030077 A1* | 2/2012 | Pei et al. | ......................... | 705/34 |
| 2012/0297076 A1* | 11/2012 | Wu et al. | ...................... | 709/227 |
| 2013/0054428 A1* | 2/2013 | Shaikh | ............................ | 705/30 |
| 2015/0195245 A1* | 7/2015 | Batz et al. | | |

OTHER PUBLICATIONS

3rd Generation Partnership Project; Technical Specification Group Services and System Aspects; Telecommunication management; Charging management; Packet Switched (PS) domain charging (Release 8); 3GPP TS 32.251 V8.2.0 (Jun. 2008) 650 Route des Lucioles—Sophia Antipolis Valbonne—France.

(Continued)

*Primary Examiner* — Kevin C Harper
*Assistant Examiner* — Derrick V Rose
(74) *Attorney, Agent, or Firm* — Duft Bornsen & Fettig, LLP

(57) ABSTRACT

Systems and methods for selecting offline charging functions per service data flow during a data session over a packet data network. One embodiment comprises a Policy and Charging Rules Function (PCRF) that receives information regarding service data flows initiated during a data session over a packet data network. For each of the service data flows, the PCRF selects an offline charging function for the service data flow based on the information for the service data flow, and provides an identifier for the selected offline charging function to a Policy and Charging Enforcement Function (PCEF). The PCEF may then generate charging requests for the service data flow in response to chargeable events, and route the charging requests to the selected offline charging function based on the identifier.

17 Claims, 5 Drawing Sheets

(56) References Cited

OTHER PUBLICATIONS

3rd Generation Partnership Project; Technical Specification Group Services and System Aspects; Telecommunication management; Charging management; Charging architecture and principles (Release 8) 3GPP TS 32.240 V8.2.0 (Mar. 2008) 650 Route des Lucioles—Sophia Antipolis Valbonne—France.

3rd Generation Partnership Project; Technical Specification Group Services and System Aspects; Policy and charging control architecture (Release 8) 3GPP TS 23.203 V8.2.0 (Jun. 2008) 650 Route des Lucioles—Sophia Antipolis Valbonne—France.

3rd Generation Partnership Project; Technical Specification Group Core Network and Terminals; Policy and Charging Control over Gx reference point (Release 8) 3GPP TS 29.212 V8.2.0 (Dec. 2008) 650 Route des Lucioles—Sophia Antipolis Valbonne—France.

\* cited by examiner

OFFLINE CHARGING PER SERVICE DATA FLOW

FIELD OF THE INVENTION

The invention is related to the field of communication systems and, in particular, to offline charging in packet data networks (PDN).

BACKGROUND

Service providers typically provide numerous voice and data services to subscribers. Examples of voice services are voice calls, call forwarding, call waiting, etc. Examples of data services are streaming audio, streaming video, Voice over IP (VoIP), online gaming, and Internet Protocol Television (IP-TV). The data services are managed by a packet core network, which interfaces the end user with external packet data networks (PDN), such as the internet. Some examples of packet core networks are a General Packet Radio Service (GPRS) core network, an Evolved Packet Core (EPC) network, etc. An end user uses a mobile device, such as a cell phone, a personal data assistant, a smart phone, etc., to connect with a Radio Access Network (RAN). The RAN may be a packet-based network that provides IP connectivity, which is also referred to as an IP Connectivity Access Network (CAN). The RAN in turn connects to the packet core network in order to provide the end user with access to the data services.

When the mobile device initiates a data session (e.g., an IP-CAN session), the session request from the mobile device includes a description of the requested data service (e.g., online gaming, IP-TV, etc). The packet core network authenticates the mobile device and determines which data services the mobile device is authorized to receive. If the requested service is authorized, then the packet core network reserves a bearer path (e.g., an IP CAN bearer) of a defined capacity, delay, and bit error rate over a selected PDN. A flow of packets may then begin for the service, which is referred to as a service data flow over the PDN.

The service providers typically implement Policy and Charging Control (PCC) within their networks. Policy control refers to the process of controlling the bearer path for service data flows. For example, policy control includes bearer establishment, Quality of Service (QoS) control, and gating control (e.g., blocking or allowing packets to pass). Charging control refers to the process of associating packets of a session to a charging key or identifier, and applying online charging and/or offline charging, as appropriate. The service providers define PCC rules that may be used for data services that are requested by end users.

The 3rd Generation Partnership Project (3GPP or 3GPP2) has defined a PCC architecture for packet core networks. One example of a PCC architecture is described in 3GPP TS 23.203 (Release 9). The PCC architecture suggested by the 3GPP includes a Policy and Charging Rules Function (PCRF), a PDN gateway comprising a Policy and Charging Enforcement Function (PCEF), an application function (AF), a Bearer Binding and Event Reporting Function (BBERF), a Home Subscriber Server (HSS)/Subscription Profile Repository (SPR), an Online Charging System (OCS), and an Offline Charging System (OFCS). As a brief description of some of the elements of the PCC architecture, the PCRF makes policy control decisions and flow-based charging control decisions to select which PCC rules to implement for service data flows. The PCEF in the gateway provides service data flow detection, user plane traffic handling, QoS handling, service data flow measurement, and online/offline charging interactions. The HSS/SPR stores subscriber data and subscription related information for end users, such as in subscriber profiles.

SUMMARY

Embodiments described herein provide improved charging for a data session by selecting offline charging functions per service data flow. Presently, an Offline Charging System (OFCS) is selected at the beginning of a data session based on the subscriber involved in the session. The selected OFCS then handles all charging requests for the data session. The embodiments described herein select offline charging functions (e.g., on OFCS) based on service data flows occurring during the data session. As multiple service data flows may initiate during a data session, different offline charging functions may be selected for the different service data flows. This advantageously results in charging requests for service data flows being more intelligently routed to offline charging functions.

One embodiment comprises a Policy and Charging Rules Function (PCRF). The PCRF is configured to receive information regarding service data flows initiated during a data session over a packet data network. For the service data flows, the PCRF is further configured to select a respective offline charging function for a respective service data flow based on the information for the respective service data flow. The PCRF is further configured to provide an identifier for the selected respective offline charging function to a Policy and Charging Enforcement Function (PCEF) for offline charging for the respective service data flow.

Another embodiment includes the PCEF. For the service data flows, the PCEF is configured to receive the identifier for the selected respective offline charging function from the PCRF, to generate at least one charging request for the respective service data flow in response to a chargeable event, and to route the at least one charging request to the selected respective offline charging function based on the identifier.

Another embodiment comprises a method of selecting offline charging functions per service data flow. The method includes receiving information regarding service data flows initiated during a data session over a packet data network. For the service data flows, the method further includes selecting a respective offline charging function for a respective service data flow based on the information for the respective service data flow, and providing an identifier for the selected respective offline charging function to a PCEF for offline charging for the respective service data flow.

In another embodiment, for the service data flows, the method further includes receiving the identifier for the selected respective offline charging function into the PCEF, generating at least one charging request for the respective service data flow in the PCEF in response to a chargeable event; and routing the at least one charging request from the PCEF to the selected respective offline charging function based on the identifier.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
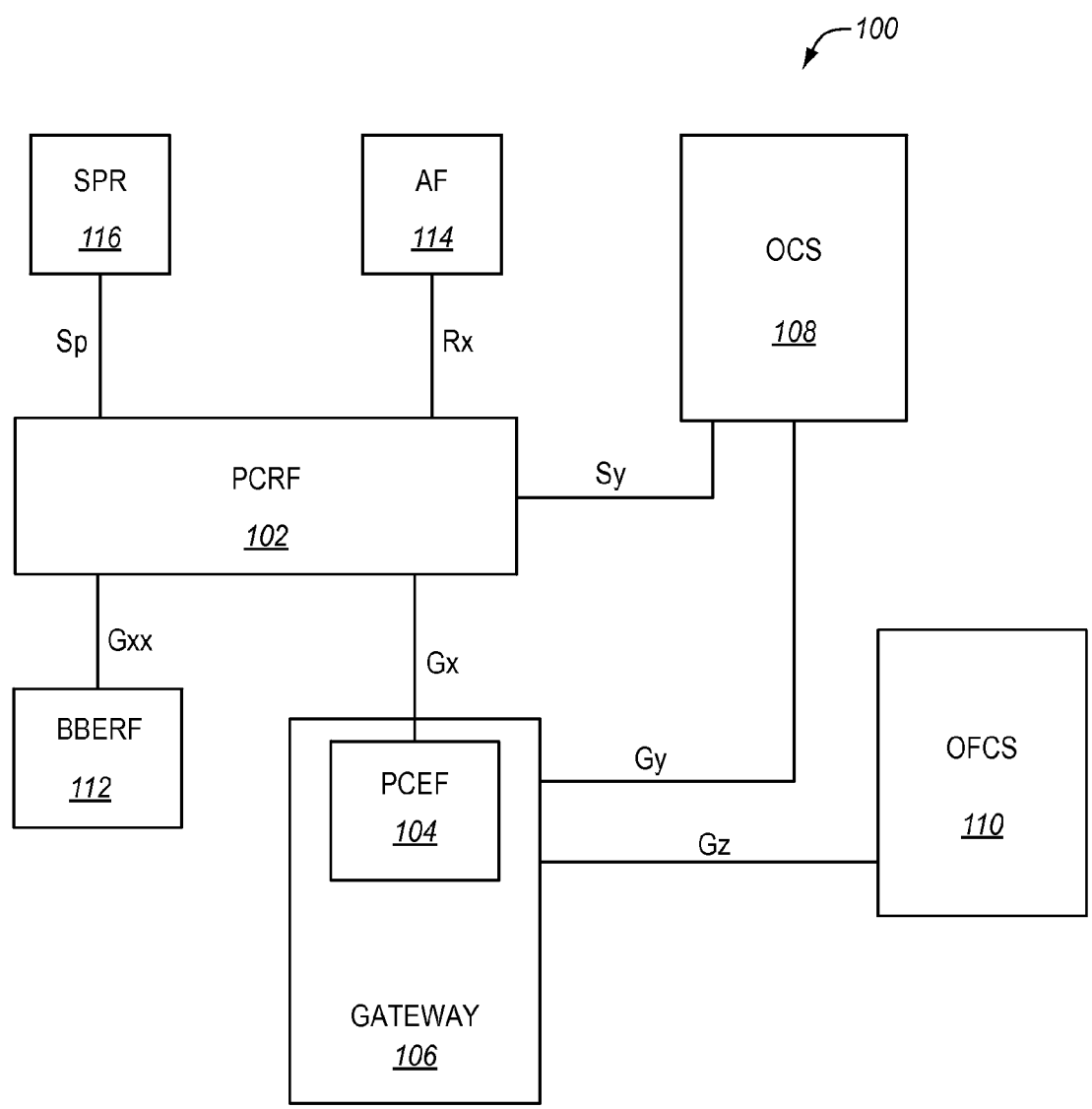
FIG. 1 illustrates a Policy and Charging Control (PCC) architecture for a packet core network in an exemplary embodiment.

FIG. 1 illustrates a Policy and Charging Control (PCC) architecture 100 for a packet core network in an exemplary embodiment. The PCC architecture 100 may be used in a Long Term Evolution/Evolved Packet Core (LTE/EPC) network or another type of 4G network. PCC architecture 100 includes a Policy and Charging Rules Function (PCRF) 102 and a Policy and Charging Enforcement Function (PCEF) 104 that together provide a Policy and Charging Control (PCC) solution in the packet core network. PCRF 102 is a node of the network that generates PCC rules for a requested service, which is referred to as making a PCC decision. PCRF 102 may include a policy engine (not shown) that makes the PCC decision. Although the term "PCRF" is used in this description, the functionality of PCRF 102 is applicable to any network node that makes policy decisions in a packet core network.

PCEF 104 is a node that enforces the PCC rules for the requested service. For example, PCEF 104 may set up bearer connections for the service, modify existing bearer connections, ensure that only authorized service data flows are established, ensure that QoS limits are not exceeded, etc. PCEF 104 is typically implemented in a gateway 106, such as a packet data gateway (P-GW) in an EPC network.

PCC architecture 100 further includes an Online Charging System (OCS) 108, an Offline Charging System (OFCS) 110, a Bearer Binding and Event Reporting Function (BBERF) 112, an application function (AF) 114, and a Subscriber Profile Repository (SPR) 116. OCS 108 provides online charging for services/sessions accessed by end users. PCRF 102 interfaces with OCS 108 via a Diameter Sy interface, and PCEF 104 interfaces with OCS 108 via a Diameter Gy interface or other suitable protocol interface. OFCS 110 provides offline charging for services/sessions accessed by end users. PCEF 104 interfaces with OFCS 110 via a Diameter Gz interface or other suitable protocol interface.

Application Function (AF) 114 is a node in the packet data network (e.g., Internet, IMS, etc) that provides services requested by an end user. AF 114 describes a requested service/media type to PCRF 102 via a Diameter Rx interface or other suitable protocol interface. For example, AF 114 may provide IP-addresses, port numbers, bit rates, delay sensitivity, etc, for requested services to PCRF 102. PCRF 102 may then use this information when making the PCC decision.

SPR 116 stores subscriber profiles for end users. The subscriber profiles may include policy rules (and possibly charging rules) that are used by PCRF 102 to make a PCC decision. The policy rules govern which network services the end user is allowed to access, the bandwidth level that is provided, the time(s) when the services are allowed, the duration of how long the services are allowed, etc. SPR 116 interfaces with PCRF 102 via a Diameter Sp interface or any other protocol used to exchange policy rules with PCRF 102.

The policy rules and charging rules together are referred to herein as a service plan (or PCC plan). Typically, a service plan is predefined for each end user.

In the embodiments described below, PCRF 102 is enhanced to select an offline charging function for each service data flow occurring during a data session (e.g., an IP-CAN session). An offline charging function comprises a function, system, or device that receives offline charging requests for a service data flow, and generates Charging Data Records (CDR) based on information provided in the charging requests. One example of an offline charging function is an OFCS. Another example of an offline charging function is a Charging Data Function (CDF) implemented in an OFCS according to 3GPP Release 9. Another example of an offline charging function is a Charging Collector Function (CCF) implemented in an OFCS according to 3GPP Release 8.

After selecting an offline charging function for a service data flow, PCRF 102 provides an identifier for the selected offline charging function to PCEF 104 over the Gx interface or other suitable protocol interface. When chargeable events occur, PCEF 104 sends charging requests for that service data flow to the selected offline charging function. Because an offline charging function is selected per service data flow, PCEF 104 may send charging requests for different service data flows to different offline charging functions during the same data session. This allows for intelligent routing of charging requests to the appropriate offline charging function.

Previously, a PCRF would select an OFCS at the beginning of a data session, and the selected OFCS would be used for all service data flows occurring during the data session. For example, when the PCRF performed an initial PCC decision for a data session, the PCRF would identify OFCS addresses (primary and secondary) for the data session. The PCRF would then provide the OFCS addresses to the PCEF in a Charging-Information Attribute Value Pair (AVP) of the Gx interface. When chargeable events occurred during the data session, the PCEF would send all charging requests for the data session to the primary OFCS address.

In the embodiments provided herein, PCRF 102 selects an offline charging function (e.g., an OFCS) per service data flow, and informs PCEF 104 of the selected offline charging function for the service data flow. PCEF 104 is then able to send charging requests for a service data flow to the appropriate offline charging function. Thus, there is not merely a global designation of an OFCS for a data session, as an offline charging function is selected for each individual service data flow.

Figure 2:
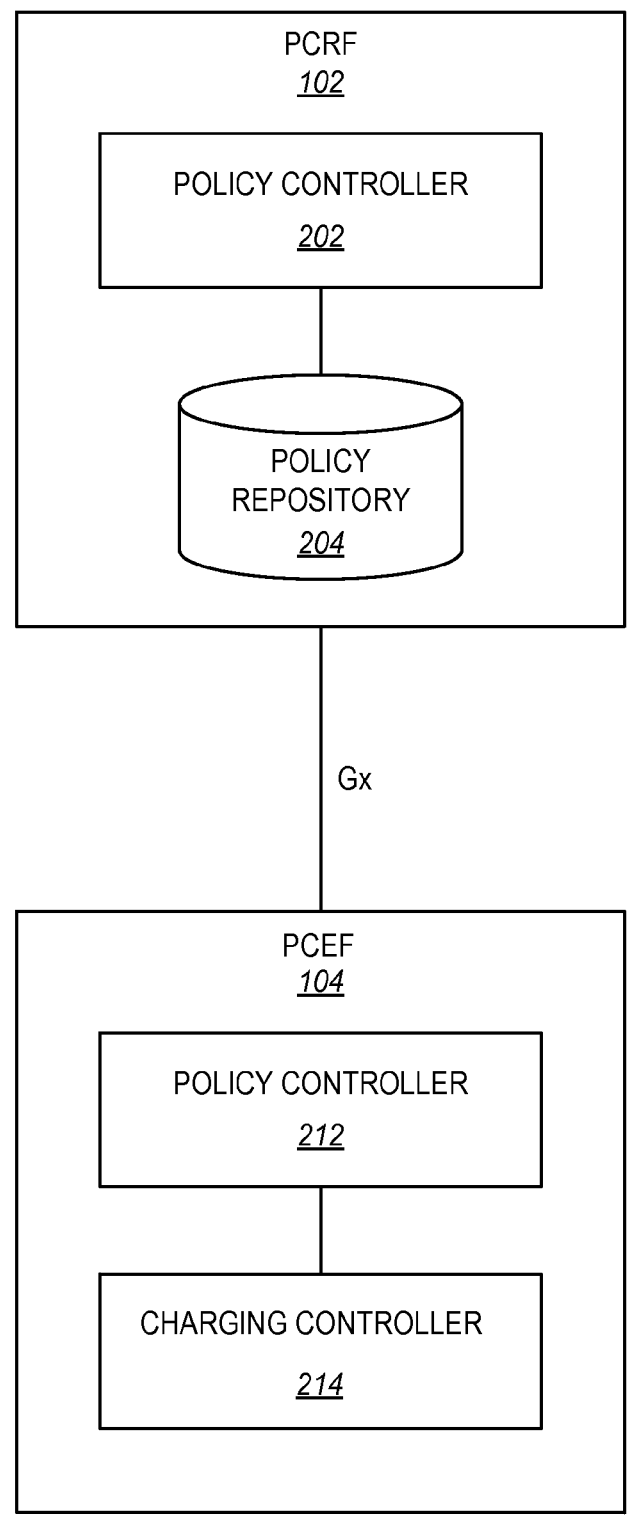
FIG. 2 illustrates a PCRF and a PCEF in an exemplary embodiment.

FIG. 2 illustrates PCRF 102 and PCEF 104 in an exemplary embodiment. PCRF 102 includes a policy controller 202 and a policy repository 204. Policy controller 202 is a device or system that makes PCC decisions for data sessions. A PCC decision includes the selection of one or more PCC rules to enforce during a data session. Policy controller 202 is also able to select an offline charging function per service data flow. Policy repository 204 is a device or system that stores policy and/or charging rules applicable to end users. These policy and/or charging rules may be used by policy controller 202 in making the PCC decision, and also in selecting an offline charging function per service data flow.

PCEF 104 includes a policy controller 212 and a charging controller 214. Policy controller 212 is a device or system that enforces PCC rules to data sessions that are established. Enforcement of PCC rules includes applying filters to downlink or uplink packets to identify the appropriate PCC rules, and then enforcing the appropriate PCC rules to the packets. Charging controller 214 is a device or system that identifies chargeable events, and sends offline charging requests to an offline charging function.

Figure 3:
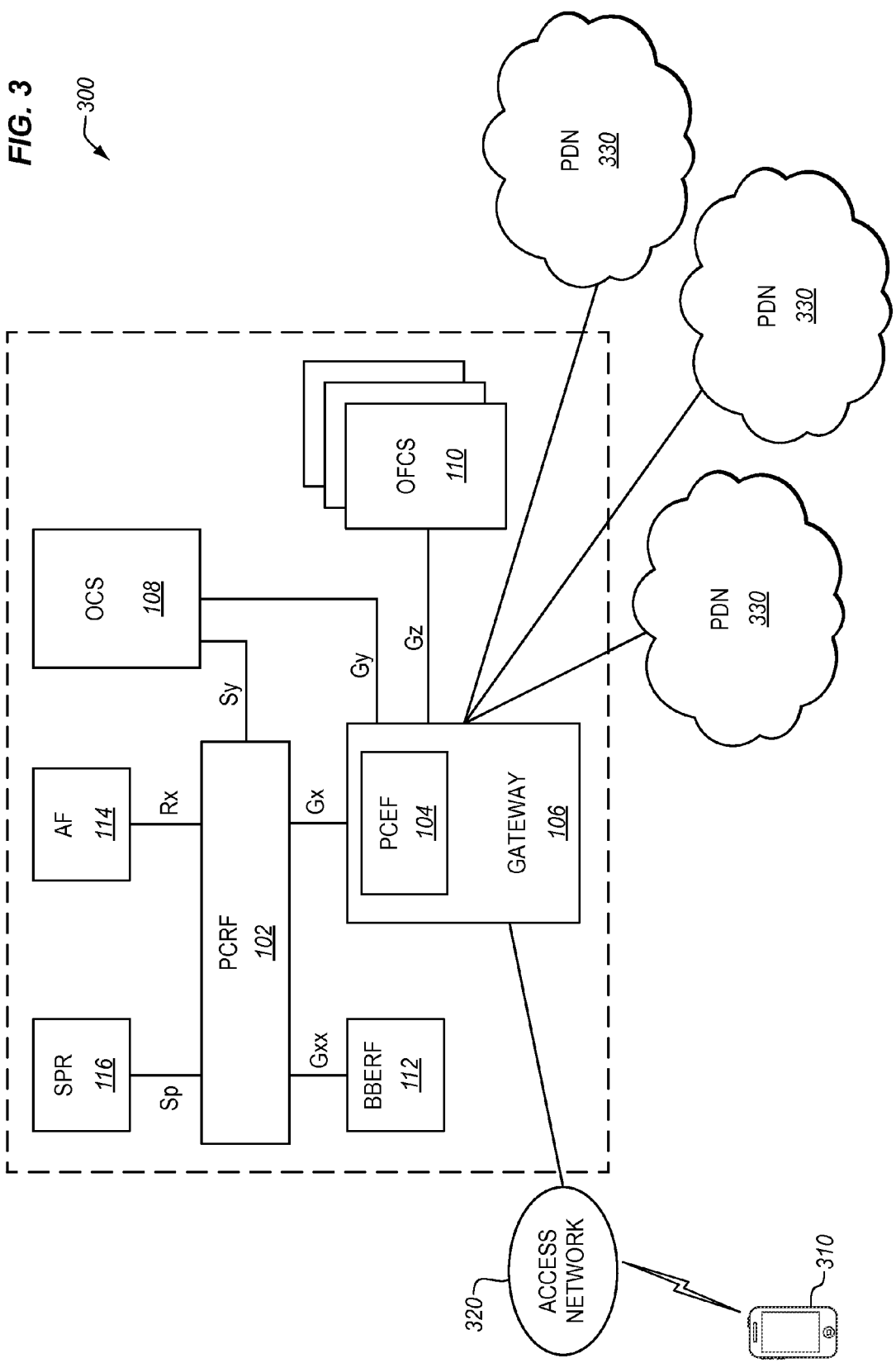
FIG. 3 illustrates a packet core network that utilizes the PCC architecture of FIG. 1 in an exemplary embodiment.

FIG. 3 illustrates a packet core network 300 that utilizes the PCC architecture of FIG. 1 in an exemplary embodiment. Packet core network 300 provides service to a UE 310 through an access network 320. One example of an access network 320 is an evolved UMTS Terrestrial Radio Access Network (e-UTRAN). Access network 320 connects to gateway 106, which in turn is connected to one or more Packet Data Networks (PDN) 330 (also referred to as packet-switched networks). One example of a PDN is the Internet.

OFCS 110 is shown in FIG. 3 as including multiple OFCS's 110. This is to illustrate that there are multiple offline charging destinations available to PCEF 104.

One assumption for the embodiments herein is that a data session begins or has been established with UE 310. A data session comprises an association between UE 310 and PDN 330. For example, if PDN 330 is an IP network, then a data session initiates when PDN 330 assigns an IP address (IPv4 address or IPv6 prefix) to UE 310. One example of a data session is an IP-CAN session. The data session for UE 310 may include one or more packet bearers. A packet bearer is a transmission path established over PDN 330. The packet bearer may have a defined capacity, delay, bit error rate, etc. One example of a packet bearer is an IP-CAN bearer. A packet bearer for a data session may include one or more service data flows. A service data flow represents the packets related to a particular service accessed by UE 310. For example, if UE 310 is web browsing, then a service data flow represents the packets related to the web browsing. If UE 310 is accessing email, then a service data flow represents the packets related to the email access. If UE 310 is accessing an IP-TV service, then a service data flow represents the packets related to the IP-TV stream.

In the following embodiments, PCRF 102 selects an offline charging function for each of the service data flows that are initiated during the data session. PCRF 102 then provides an identifier (ID) for each of the service data flows to PCEF 104 so that PCEF 104 may send charging requests for the service data flows to the appropriate offline charging function. This functionality is further described in relation to FIGS. 4-5.

Figure 4:
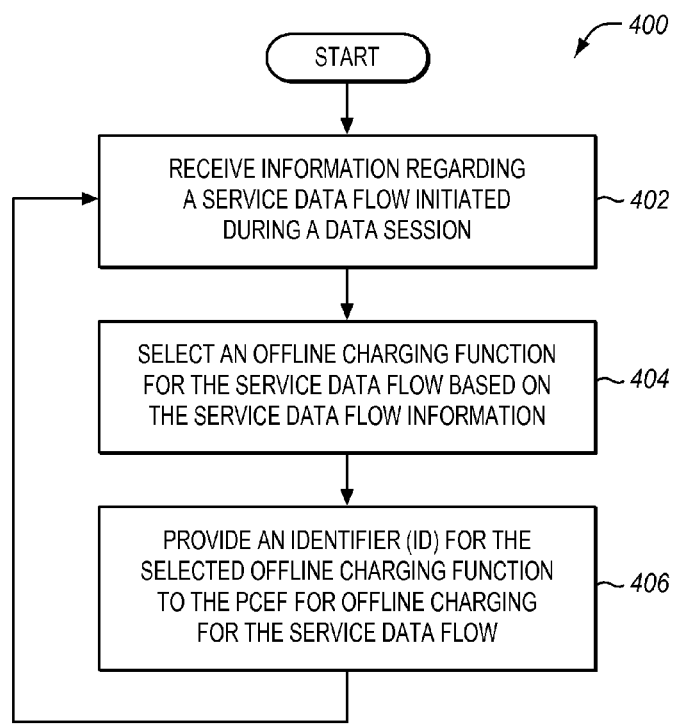
FIG. 4 is a flow chart illustrating a method of selecting offline charging functions for service data flows in an exemplary embodiment.

FIG. 4 is a flow chart illustrating a method 400 of selecting offline charging functions for service data flows in an exemplary embodiment. The steps of method 400 are described with reference to PCC architecture 100 in FIG. 1 and PCRF 102 in FIG. 2, although methods described herein may be performed in other nodes or systems. The steps of the flow charts described herein are not all inclusive and may include other steps not shown. The steps may also be performed in an alternative order.

In step 402, policy controller 202 in PCRF 102 receives information regarding a service data flow initiated during the data session. The service data flow information may be received from a variety of entities. For example, PCRF 102 may receive a request from PCEF 104 over the Gx interface, such as a CC-Request, that includes information on a service data flow initiated during the data session. In another example, PCRF 102 may receive session, media, and/or subscriber-related information regarding a service data flow from AF 114 over the Rx interface. The service data flow information may include location information for UE 310, a destination address for a content server in PDN 330, a service ID, an IP-CAN type, or any other type of data that describes the service data flow.

In step 404, policy controller 202 processes the service data flow information to select an offline charging function for the service data flow. There may be multiple offline charging functions available for offline charging. Thus, policy controller 202 selects one of the offline charging functions for this particular service data flow. The selected offline charging function is considered the primary offline charging function. Policy controller 202 may also select a secondary offline charging function for this particular service data flow. The selection of an offline charging function (primary or secondary) may refer to the selection of a particular OFCS, a particular Charging Data Function (CDF), a particular Charging Collector Function (CCF), etc.

The selection of the offline charging function for the service data flow may be part of a PCC decision. For example, when service data flows initiate during a data session, this will trigger a new PCC decision in PCRF 102 in most cases. Thus, policy controller 202 identifies a subscriber profile for the end user of UE 310, such as in policy repository 206 or SPR 116. The subscriber profile indicates policy rules and charging rules applicable to data sessions involving the end user. Additionally, there may be global policy rules and charging rules that apply to the end user. For instance, the global policy rules and charging rules may be based on the class of service for the end user's subscription, location of the end user, etc. Policy controller 202 then uses the applicable policy and charging rules to make a PCC decision for a service data flow. The PCC decision defines which PCC rules are applicable for the service data flow. In this embodiment, the PCC decision also selects an offline charging function for the service data flow.

After selecting the offline charging function for the service data flow, policy controller 202 provides an identifier (ID) for the selected offline charging function to PCEF 104 in step 406 for offline charging for the service data flow. The interface between PCRF 102 and PCEF 104 is a Diameter Gx interface or other suitable protocol interface. Accordingly, PCRF 102 may provide the ID for the selected offline charging function to PCEF 104 in a Gx message. In this embodiment, a new or enhanced Attribute Value Pair (AVP) is defined in the Gx interface for an offline charging function ID that is selected for a service data flow. Previously, a Charging-Information AVP was defined in the Gx interface for the charging method provisioned for a data session, where the charging method was either online or offline and the provisioned charging method applied to the entire data session. The new or enhanced AVP is defined in the Gx interface for an offline charging function per service data flow, and maps an offline charging function to a service data flow. The message sent to PCEF 104 may be a Diameter CC-Answer message sent over the Gx interface (for a PULL operation from PCEF 104 to PCRF 102). The message may alternatively be a Diameter Re-Authorization Request (RA-Request) sent over the Gx interface (for a PUSH operation from PCRF 102 to PCEF 104).

Figure 5:
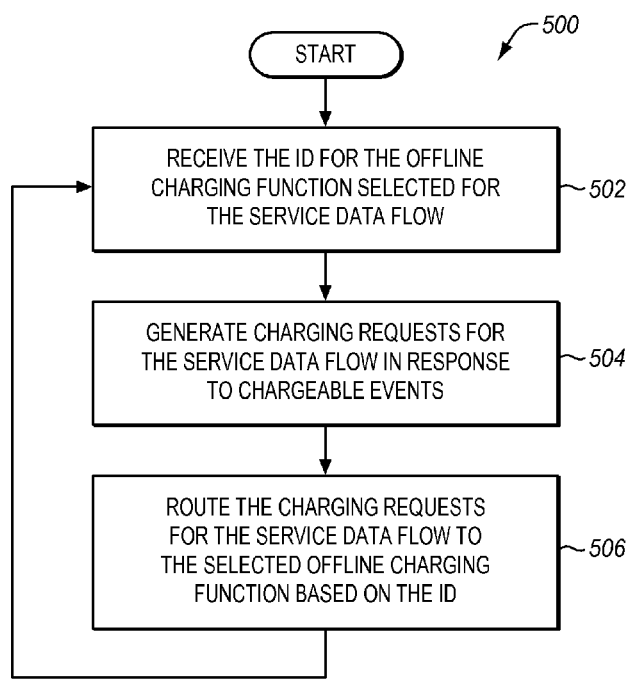
FIG. 5 is a flow chart illustrating a method of performing offline charging for service data flows in an exemplary embodiment.

FIG. 5 is a flow chart illustrating a method 500 of performing offline charging for service data flows in an exemplary embodiment. The steps of method 500 are described with reference to PCC architecture 100 in FIG. 1 and PCEF 104 in FIG. 2, although methods described herein may be performed in other nodes or systems.

In step 502, policy controller 212 of PCEF 104 receives the offline charging function ID for the service data flow from PCRF 102. Policy controller 212 may then store the offline charging function ID for the service data flow. As stated above, the selection of the offline charging function may be part of a PCC decision. Therefore, PCRF 102 may also provide one or more PCC rules to PCEF 104 (e.g., provide dynamic PCC rules, activate/deactivate static PCC rules in PCEF 104, etc.). Policy controller 212 may store the offline charging function ID for the service data flow as part of the charging parameters for the PCC rule.

Policy controller 212 may then identify packets for the service data flow using service data flow filters in the PCC rules. When handling the packets identified for the service data flow, charging controller 214 identifies chargeable events for the service data flow, such as through an offline Charging Trigger Function (CTF). In step 504, charging controller 214 generates charging requests for the service data flow in response to the chargeable events. The charging requests may comprise Diameter Accounting Requests (ACR) [e.g., start,interim,stop]. In step 506, charging controller 214 routes the charging requests for the service data flow to the selected offline charging function based on the offline charging function ID. Thus, each of the charging requests for this service data flow is forwarded to the offline charging function that was specifically selected for this service data flow.

Methods 400 and 500 are repeated for multiple service data flows that are initiated during the data session. Thus, the next time a service data flow initiates during the data session, PCRF 102 receives information regarding the service data flow and processes the service data flow information to select an offline charging function for the new (i.e., newly initiated) service data flow. The selected offline charging function for the new service data flow may be different than the selected offline charging function for the prior service data flow even though they are both part of the same data session. After selecting the offline charging function for the new service data flow, PCRF 102 provides an ID for the selected offline charging function to PCEF 104. When chargeable events are identified for this new service data flow, PCEF 104 generates charging requests for this new service data flow in response to the chargeable events, and routes the charging requests for this new service data flow to the selected offline charging function based on the offline charging function ID.

Because an offline charging function is selected per service data flow, there is more intelligent routing of charging requests to offline charging destinations. The charging requests can therefore be distributed to the proper offline charging function in an effective manner.

EXAMPLE

The following example illustrates selection of an offline charging function per service data flow for IP-CAN sessions. This example is not intended to limit the scope of the embodiments described above.

In FIG. 3, when an IP-CAN session is first established by UE 310, PCEF 104 sends an initial request to PCRF 102 for PCC rules. To do so, PCEF 104 formats a Diameter CC-Request with the CC-Request-Type AVP set to "INITIAL_REQUEST". PCEF 104 also populates the CC-Request with other information, such as:

User identification (e.g., inserted in Subscription-Id AVP)
Type of IP-CAN (e.g., inserted in IP-CAN-Type AVP)
PDN information (e.g., inserted in Called-Station-ID AVP)
PDN connection identifier (e.g., inserted in PDN-Connection-ID AVP)
QoS-related information
UE identification (e.g., IPv4 or IPv6 or both)

In response to the CC-Request, PCRF 102 makes a PCC decision based on the information provided in the CC-Request and other information acquired by PCRF 102. For the PCC decision, PCRF 102 may activate/deactivate a predefined PCC rule at PCEF 104, or install, modify, or remove a dynamically-provisioned PCC rule. Part of the PCC decision in this embodiment is selection of an offline charging function to handle offline charging for a service data flow (SDF 1) established for this IP-CAN session. Assume for this example that the selected offline charging function is Charging Data Function (CDF) 1. PCRF 102 may then provide an ID for the selected CDF to PCEF 104. The CDF ID in this example is an IP address for CDF 1.

PCRF 102 is able to provide the CDF ID to PCEF 104 because the Diameter Gx interface has been enhanced to include a new AVP. Thus, PCRF 102 formats a Diameter CC-Answer that includes the CDF ID. The following illustrates a CC-Answer in this example:

```
<CC-Answer> ::= < Diameter Header: 272, PXY >
    < Session-Id >
    { Auth-Application-Id }
    { Origin-Host }
    { Origin-Realm }
    [ Result-Code ]
    [ Experimental-Result ]
    { CC-Request-Type }
    { CC-Request-Number }
    [ Supported-Features ]
    [ Bearer-Control-Mode ]
    [ Event-Trigger ]
    [ Origin-State-Id ]
    [ Redirect-Host ]
    [ Redirect-Host-Usage ]
    [ Redirect-Max-Cache-Time ]
    [ Charging-Rule-Remove ]
    [ Charging-Rule-Install ]
    [ Charging-Information ]
    [ Online ]
    [ Offline ]
    [ Offline-SDF ]
    [ QoS-Information ]
    [ Revalidation-Time ]
    [ Default-EPS-Bearer-QoS ]
    [ Bearer-Usage ]
    [ 3GPP-User-Location-Info ]
    [ Usage-Monitoring-Information ]
    [ CSG-Information-Reporting ]
    [ User-CSG-Information ]
    [ Error-Message ]
    [ Error-Reporting-Host ]
    [ Failed-AVP ]
    [ Proxy-Info ]
    [ Route-Record ]
    [ AVP ]
```

The "Offline-SDF" AVP (indicated above in bold type) is new to the Diameter Gx interface. This AVP allows for a mapping between an identifier for the selected offline charging function (e.g., the CDF address) and a service data flow (SDF). For example, the AVP may look like:

"CDF 1 address→SDF 1"

This means that the CDF 1 address is mapped to SDF 1. The "Offline-SDF" AVP may include multiple mappings if multiple service data flows exist for the IP-CAN session. The CC-Answer also includes the PCC rules to implement for the service data flow(s). With the CC-Answer populated, PCRF 102 sends the CC-Answer to PCEF 104.

When PCEF 104 receives the CC-Answer, it stores the PCC rules and stores the CDF ID for SDF 1 and any other service data flow(s). PCEF 104 then enforces the PCC rules provided by PCRF 102.

In enforcing the PCC rules, PCEF 104 processes uplink and downlink packets based on the service data flow filters provided in the PCC rules to identify packets belonging to SDF 1. PCEF 104 includes a Charging Trigger Function (CTF) that collects information pertaining to chargeable events based on the packets identified for SDF 1. The CTF generates charging requests (also referred to as charging events) for the chargeable events, such as Diameter Rf Accounting Requests (ACR) [e.g., start,interim,stop]. The CTF in PCEF 104 then identifies the offline charging destination for the charging request (which is an IP address for CDF 1), and routes the charging requests to CDF 1 based on the IP address. Thus, each charging request for SDF 1 will be routed to CDF 1.

At some point, the IP-CAN session may be modified. For example, if an end user of UE 310 is surfing the web and then places a voice call, then the IP-CAN session will be modified to add another service data flow for the voice call. When an IP-CAN session is modified, PCEF 104 sends a CC-Request to PCRF 102 with CC-Request-Type AVP set to "UPDATE_REQUEST" to request a new PCC decision. PCEF 104 also populates the CC-Request with information about the modified IP-CAN session.

In response to the CC-Request, PCRF 102 makes a new PCC decision based on the information provided in the CC-Request and other information acquired by PCRF 102. Part of the PCC decision in this embodiment is selection of an offline charging function for the new service data flow (SDF 2) established for this IP-CAN session. Assume for this example that the selected offline charging function is Charging Data Function (CDF) 2. PCRF 102 may then provide an ID for the selected CDF to PCEF 104, which is an IP address for CDF 2.

PCRF 102 formats a Diameter CC-Answer, and inserts the IP address for CDF 2 in the "Offline-SDF" AVP (the new AVP in the Diameter Gx interface). Again, this AVP allows for a mapping between an identifier for the selected CDF (e.g., the CDF address) and a service data flow (SDF) identifier. For example, the AVP may look like:

"CDF 2 address→SDF 2"

The CC-Answer also includes the PCC rules to implement for the service data flow(s). With the CC-Answer populated, PCRF 102 sends the CC-Answer to PCEF 104.

When PCEF 104 receives the CC-Answer, it stores the PCC rules and stores the CDF ID (i.e., the IP address for CDF 2) for SDF 2 and any other service data flow(s). PCEF 104 then enforces the PCC rules provided by PCRF 102.

In enforcing the PCC rules, PCEF 104 processes uplink and downlink packets based on the service data flow filters provided in the PCC rules to identify packets belonging to the SDF 2. The CTF in PCEF 104 collects information pertaining to chargeable events based on the packets identified for SDF 2. The CTF generates charging requests for the chargeable events, and identifies the offline charging destination for the charging requests, which is the IP address for CDF 2. The CTF routes the charging requests to CDF 2 based on the IP address. Thus, each charging request for SDF 2 will be routed to CDF 2.

A similar process occurs for each service data flow that is established during the IP-CAN session. Thus, charging requests for different service data flows may be routed to different offline charging destinations. The charging requests are advantageously routed in an intelligent manner so that the appropriate offline charging destination is handling the requests. For example, it may be advantageous to route charging requests for the web browsing SDF to CDF 1, and to route charging requests for the voice call SDF to CDF 2. The selection of an offline charging destination per service data flow allows for this type of intelligent routing of charging requests.

Any of the various elements shown in the figures or described herein may be implemented as hardware, software in conjunction with hardware, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The executable instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
   a Policy and Charging Rules Function (PCRF) comprising
     a processor configured to receive information regarding a plurality of service data flows initiated during a data session over a packet data network, and to select offline charging functions for the service data flows where multiple offline charging functions are available for offline charging;
     for each individual service data flow of the plurality initiated during the data session, the processor of the PCRF is configured to select one of the multiple offline charging functions based on the information for the individual service data flow to act as a primary offline charging function for the individual service data flow, and to provide an address for the primary offline charging function selected for the individual service data flow to a Policy and Charging Enforcement Function (PCEF) to use for offline charging for the individual service data flow;

the processor of the PCRF is configured to connect to the PCEF over a Diameter Gx interface;

the Gx interface includes a new Attribute Value Pair (AVP) that indicates a mapping between each of the individual service data flows and the primary offline charging function selected for each of the individual service data flows; and the new AVP includes multiple mappings if multiple service data flows exist for the data session.

2. The system of claim 1 further comprising the PCEF, wherein:

for each individual service data flow of the plurality initiated during the data session, the PCEF includes a processor configured to receive the address for the primary offline charging function selected for the individual service data flow from the PCRF, to generate at least one charging request for the individual service data flow in response to a chargeable event, and to route the at least one charging request to the primary offline charging function based on the address.

3. The system of claim 1 wherein:

the processor of the PCRF is further configured to generate a Diameter Gx message, to insert a mapping between the individual service data flow and the address for the primary offline charging function in the AVP, and to transmit the Diameter Gx message to the PCEF.

4. The system of claim 1 wherein:

the primary offline charging function comprises a Charging Data Function (CDF); and the address for the primary offline charging function comprises an IP address for the CDF.

5. The system of claim 1 wherein:

the processor of the PCRF is further configured to receive the information regarding the service data flows from the PCEF over the Diameter Gx interface.

6. The system of claim 1 wherein:

the processor of the PCRF is further configured to receive the information regarding the service data flows from an Application Function (AF) over a Diameter Rx interface.

7. The system of claim 1 wherein:

the processor of the PCRF is further configured to select a second one of the multiple offline charging functions based on the information for the individual service data flow to act as a secondary offline charging function for the individual service data flow, and to provide an address for the secondary offline charging function selected for the individual service data flow to the PCEF.

8. A method comprising:

receiving information regarding a plurality of service data flows initiated during a data session over a packet data network; and selecting offline charging functions for the service data flows where multiple offline charging functions are available for offline charging, wherein selecting offline charging functions comprises:

for each individual service data flow of the plurality initiated during the data session, selecting one of the multiple offline charging functions based on the information for the individual service data flow to act as a primary offline charging function for the individual service data flow; and providing an address for the primary offline charging function selected for the individual service data flow to a Policy and Charging Enforcement Function (PCEF) to use for offline charging for the individual service data flow;

wherein selecting the primary offline charging function for the individual service data flow and providing the address for the primary offline charging function to the PCEF is performed in a Policy and Charging Rules Function (PCRF);

the PCRF and the PCEF are connected over a Diameter Gx interface;

the Gx interface includes a new Attribute Value Pair (AVP) that indicates a mapping between each of the individual service data flows and the primary offline charging function selected for each of the individual service data flows; and the new AVP includes multiple mappings if multiple service data flows exist for the data session.

9. The method of claim 8 further comprising:

for each individual service data flow of the plurality initiated during the data session, receiving the address for the primary offline charging function selected for the individual service data flow into the PCEF;

generating at least one charging request for the individual service data flow in the PCEF in response to a chargeable event; and routing the at least one charging request from the PCEF to the primary offline charging function based on the address.

10. The method of claim 8 wherein providing the address for the primary offline charging function to the PCEF comprises:

generating a Diameter Gx message;

inserting a mapping between the individual service data flow and the address for the primary offline charging function in the AVP; and transmitting the Diameter Gx message to the PCEF.

11. The method of claim 8 wherein:

the offline charging function comprises a Charging Data Function (CDF); and the address for the primary offline charging function comprises an IP address for the CDF.

12. The method of claim 8 further comprising:

receiving the information regarding the service data flows from the PCEF over the Diameter Gx interface.

13. The method of claim 8 further comprising:

receiving the information regarding the service data flows from an Application Function (AF) over a Diameter Rx interface.

14. The method of claim 8 further comprising:

for each individual service data flow of the plurality initiated during the data session, selecting a second one of the multiple offline charging functions based on the information for the individual service data flow to act as a secondary offline charging function for the individual service data flow; and providing an address for the secondary offline charging function selected for the individual service data flow to the PCEF.

15. A system comprising:
- a Policy and Charging Enforcement Function (PCEF) having multiple offline charging functions available for offline charging;
- the PCEF comprising a processor configured to enforce rules on a plurality of service data flows initiated during a data session over a packet data network;
- for each individual service data flow of the plurality initiated during the data session, the processor of the PCEF is configured to receive an address for one of the multiple offline charging functions selected by a Policy and Charging Rules Function (PCRF) as a primary offline charging function for the individual service data flow, to generate at least one charging request for the individual service data flow in response to a chargeable event, and to route the at least one charging request to the primary offline charging function based on the address;
- the processor of the PCEF is configured to connect to the PCRF over a Diameter Gx interface; and
- the Gx interface includes a new Attribute Value Pair (AVP) that indicates a mapping between each of the individual service data flows and the primary offline charging function selected for each of the individual service data flows;
- the new AVP includes multiple mappings if multiple service data flows exist for the data session.

16. The system of claim 15 wherein:
the processor of the PCEF is further configured to transmit an initial request to the PCRF for Policy and Charging Control (PCC) rules when the data session is established, and to receive an answer to the initial request from the PCRF that includes a first address for a first offline charging function that is selected for a first service data flow.

17. The system of claim 16 wherein:
the processor of the PCEF is further configured to transmit an update request to the PCRF for PCC rules when the data session is modified to add a second service data flow, and to receive another answer to the update request from the PCRF that includes a second address for a second offline charging function that is selected for the second service data flow.

* * * * *